(12) United States Patent
Yasui et al.

(10) Patent No.: US 9,725,795 B2
(45) Date of Patent: Aug. 8, 2017

(54) GALVANNEALED STEEL SHEET AND METHOD OF MANUFACTURING THE SAME

(71) Applicant: NIPPON STEEL & SUMITOMO METAL CORPORATION, Tokyo (JP)

(72) Inventors: Takeshi Yasui, Ichihara (JP); Kojiro Akiba, Tokai (JP); Kiyokazu Ishizuka, Himeji (JP); Koki Tanaka, Yokohama (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 14/654,762

(22) PCT Filed: Dec. 25, 2012

(86) PCT No.: PCT/JP2012/083479
§ 371 (c)(1),
(2) Date: Jun. 22, 2015

(87) PCT Pub. No.: WO2014/102901
PCT Pub. Date: Jul. 3, 2014

(65) Prior Publication Data
US 2015/0329946 A1 Nov. 19, 2015

(51) Int. Cl.
*C22C 38/38* (2006.01)
*C22C 38/16* (2006.01)
(Continued)

(52) U.S. Cl.
CPC ............ *C22C 38/38* (2013.01); *B32B 15/013* (2013.01); *B32B 15/043* (2013.01); *B32B 15/18* (2013.01);
(Continued)

(58) Field of Classification Search
CPC ..... B32B 15/013; B32B 15/043; B32B 15/18; C23C 2/02; C23C 2/28; C23C 2/06;
(Continued)

(56) References Cited

U.S. PATENT DOCUMENTS

2006/0124907 A1* 6/2006 Takada ................. C21D 8/0273
252/500
2009/0162691 A1 6/2009 Ishizuka et al.
(Continued)

FOREIGN PATENT DOCUMENTS

JP 4-276057 A 10/1992
JP 5-59429 A 3/1993
(Continued)

OTHER PUBLICATIONS

International Search Report, issued in PCT/JP2012/083479, dated Apr. 2, 2013.
(Continued)

*Primary Examiner* — Michael E La Villa
(74) *Attorney, Agent, or Firm* — Birch, Stewart, Kolasch & Birch, LLP

(57) ABSTRACT

A galvannealed steel sheet includes: a steel sheet; a coating layer on a surface of the steel sheet; and a mixed layer formed between the steel sheet and the coating layer, in which the mixed layer includes a base iron portion having fine grains having a size of greater than 0 μm and equal to or smaller than 2 μm, a Zn—Fe alloy phase, and oxides containing one or more types of Mn, Si, Al, and Cr, and in the mixed layer, the oxides and the Zn—Fe alloy phase are present in grain boundaries that form the fine grains and the Zn—Fe alloy phase is tangled with the base iron portion.

$[Mn]+[Si]+[Al]+[Cr] \geq 0.4$ (Expression 1)

20 Claims, 5 Drawing Sheets

(51) Int. Cl.

| | |
|---|---|
| C22C 38/08 | (2006.01) |
| C22C 38/14 | (2006.01) |
| C22C 38/12 | (2006.01) |
| C22C 38/06 | (2006.01) |
| C22C 38/04 | (2006.01) |
| C22C 38/02 | (2006.01) |
| C22C 38/00 | (2006.01) |
| C22C 18/04 | (2006.01) |
| C22C 18/00 | (2006.01) |
| C22C 38/18 | (2006.01) |
| C23C 2/06 | (2006.01) |
| C21D 1/48 | (2006.01) |
| C21D 1/84 | (2006.01) |
| C21D 1/26 | (2006.01) |
| C21D 6/00 | (2006.01) |
| C23F 17/00 | (2006.01) |
| B32B 15/01 | (2006.01) |
| C23C 28/00 | (2006.01) |
| C23C 30/00 | (2006.01) |
| B32B 15/18 | (2006.01) |
| B32B 15/04 | (2006.01) |
| C23C 2/02 | (2006.01) |
| C23C 2/28 | (2006.01) |
| C22C 38/58 | (2006.01) |
| C21D 1/74 | (2006.01) |
| C21D 8/04 | (2006.01) |
| C21D 9/56 | (2006.01) |

(52) U.S. Cl.
CPC ............... *C21D 1/26* (2013.01); *C21D 1/48* (2013.01); *C21D 1/74* (2013.01); *C21D 1/84* (2013.01); *C21D 6/004* (2013.01); *C21D 8/0478* (2013.01); *C21D 9/561* (2013.01); *C22C 18/00* (2013.01); *C22C 18/04* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/58* (2013.01); *C23C 2/02* (2013.01); *C23C 2/06* (2013.01); *C23C 2/28* (2013.01); *C23C 28/321* (2013.01); *C23C 28/322* (2013.01); *C23C 28/345* (2013.01); *C23C 30/00* (2013.01); *C23C 30/005* (2013.01); *C23F 17/00* (2013.01); *C21D 6/005* (2013.01); *C21D 6/008* (2013.01); *C21D 2211/004* (2013.01); *Y10T 428/12792* (2015.01); *Y10T 428/12799* (2015.01); *Y10T 428/12972* (2015.01); *Y10T 428/12979* (2015.01); *Y10T 428/24942* (2015.01); *Y10T 428/24967* (2015.01); *Y10T 428/265* (2015.01)

(58) Field of Classification Search
CPC ... C23C 28/321; C23C 28/345; C23C 28/322; C23C 30/00; C23C 30/005; Y10T 428/12799; Y10T 428/12792; Y10T 428/12979; Y10T 428/24942; Y10T 428/12972; Y10T 428/24967; Y10T 428/265; C22C 18/00; C22C 38/00; C22C 38/58; C22C 38/38; C22C 38/18; C22C 38/16; C22C 18/04; C22C 38/08; C22C 38/14; C22C 38/12; C22C 38/06; C22C 38/04; C22C 38/02; C22C 38/002; C22C 38/001; C22C 38/20; C22C 38/22; C22C 38/24; C22C 38/26; C22C 38/28; C22C 38/40; C22C 38/42; C22C 38/44; C22C 38/46; C22C 38/48; C22C 38/50
See application file for complete search history.

(56) References Cited

U.S. PATENT DOCUMENTS

| | | | |
|---|---|---|---|
| 2010/0104891 A1* | 4/2010 | Nakagaito | C21D 9/46 428/659 |
| 2010/0304183 A1* | 12/2010 | Honda | C21D 8/0263 428/659 |
| 2011/0284136 A1 | 11/2011 | Kurosaki et al. | |
| 2012/0152411 A1 | 6/2012 | Morimoto et al. | |

FOREIGN PATENT DOCUMENTS

| | | |
|---|---|---|
| JP | 5-311372 A | 11/1993 |
| JP | 6-256857 A | 9/1994 |
| JP | 10-46305 A | 2/1998 |
| JP | 10-183322 A | 7/1998 |
| JP | 2003-105514 A | 4/2003 |
| JP | 2006-517257 A | 7/2006 |
| JP | 2008-24972 A | 2/2008 |
| JP | 2011-7250 A | 1/2011 |
| JP | 2011-74422 A | 4/2011 |
| JP | 2011-117040 A | 6/2011 |
| JP | 2011-127216 A | 6/2011 |
| JP | 4718782 B2 | 7/2011 |
| JP | 2011-153367 A | 8/2011 |
| TW | I322193 B | 3/2010 |
| TW | 201030181 A | 8/2010 |
| WO | WO 2004/063410 A1 | 7/2004 |
| WO | WO 2008/123267 A1 | 10/2008 |
| WO | WO 2011/025042 A1 | 3/2011 |

OTHER PUBLICATIONS

Notice of Allowance, issued in TW 101150413, dated Sep. 9, 2014.
Office Action, issued in JP 2011-227336, dated Mar. 25, 2014.
Office Action, issued in JP 2011-227344, dated Feb. 18, 2014.
Written Opinion of the International Searching Authority, issued in PCT/JP2012/083479, dated Apr. 2, 2013.

\* cited by examiner

GALVANNEALED STEEL SHEET AND METHOD OF MANUFACTURING THE SAME

TECHNICAL FIELD OF THE INVENTION

The present invention relates to a galvannealed steel sheet having excellent coating adhesion, and a method of manufacturing the same.

RELATED ART

In recent years, particularly in the field of vehicle technology, there has been an increasing demand for high-strength steel sheets from the viewpoint of a reduction in the weight of a vehicle body for the purpose of energy saving by fuel efficiency enhancement. In response to this demand, for example, in Patent Document 1, a steel sheet having a structure in which three phases including ferrite, bainite, and austenite are mixed, as its steel sheet structure is disclosed. In addition, it is disclosed that this steel sheet is a steel sheet which uses transformation-induced plasticity that exhibits high ductility due to the transformation of retained austenite into martensite during forming work.

This type of steel sheet contains, for example, 0.05 mass % to 0.4 mass % of C, 0.2 mass % to 3.0 mass % of Si, and 0.1 mass % to 2.5 mass % of Mn and has a composite structure formed by annealing in a dual-phase region and thereafter controlling the temperature pattern in a cooling process. Therefore, the steel sheet is characterized in that necessary properties can be ensured without using expensive alloy elements.

In a case where zinc plating is performed on the steel sheet by a continuous hot dip zinc plating facility in order to impart a rust preventive function thereto, coating wettability is significantly degraded when the Si content of the steel sheet is higher than 0.3 mass %. Therefore, in the Sendzimir method in which a typical molten zinc bath containing Al is used, non-coating defects are generated, and there is a problem in that the quality of the external appearance is degraded.

It is said that this is because an external oxide film including oxides containing Si or Mn which have poor wettability to molten Zn is generated on the surface of the steel sheet during reduction annealing.

As means for solving this problem, in Patent Document 2, a method of heating a steel sheet in advance in an atmosphere with an air ratio of 0.9 to 1.2 to form Fe oxides, controlling the thickness of the oxides to 500 Å or smaller in a reduction zone containing $H_2$, and thereafter performing coating in a bath to which Mn and Al are added is proposed. However, in an actual production line, various steel sheets containing various addition elements pass therethrough and thus it is difficult to accurately control the thickness of the oxides.

As another means for limiting non-coating defects, in Patent Document 3, a method of applying a specific coating to a lower layer to improve coating properties is disclosed. However, in this method, there is a need to newly provide a coating facility in the front stage of an annealing furnace in a hot dip zinc plating line or to perform a coating process in advance in an electro coating line. In either case, a significant increase in manufacturing costs is expected.

On the other hand, in Patent Document 4, a method of manufacturing a galvannealed steel sheet by adjusting the oxygen potential in an annealing atmosphere during annealing so as not to oxidize the Fe in a steel sheet is disclosed. In this method, easily oxidizable elements such as Si and Mn in steel are allowed to be internally oxidized by controlling the oxygen potential in the atmosphere such that the formation of an external oxide film is limited and the enhancement of coating properties is achieved.

According to applying this method, the steel sheet is re-heated after coating and a Zn coating layer and the steel sheet are allowed to react with each other. Therefore, a Zn—Fe alloying reaction can uniformly proceed when an alloy coating layer made of a Zn—Fe alloy is formed. However, although sufficient adhesion is ensured during typical work, an effect of improving coating adhesion during heavy duty working cannot be obtained.

A high-strength steel sheet used as a vehicle reinforcing member is generally worked by working mainly including bending. In a case where a high-strength steel sheet having a relatively high C content is used as a starting sheet, since the starting sheet itself is hard, cracks may be easily initiated in the surface layer of the steel sheet during bending. Such cracks are the cause of cracking of the steel sheet in the through-thickness direction during the use of the steel sheet.

In order to solve this problem with bendability, in Patent Document 5, the applicant suggests a technique of controlling the oxygen potential in an annealing atmosphere to enhance coating properties, reducing the C content in the surface of a steel sheet to enhance the ductility of the outermost surface layer and limit the initiation of cracks, and allowing the oxides to limit the propagation of cracks even when cracks are initiated and ensuring the bendability of the steel sheet by generating oxides of Si and Mn in the vicinity of the surface layer of the steel sheet.

However, in the technique of Patent Document 5, even when the steel sheet is annealed under conditions such that the internal oxidation occurs, not all oxides that are generated at the interface between the coating and the steel sheet are removed. Therefore, depending on the properties and state of the interface between the coating layer and the steel sheet caused by the generation behavior of the oxides, there may be a case where the adhesion between the steel sheet and the coating layer is deteriorated and there is a problem in that the coating is peeled off during working.

In a case where a coated steel sheet is manufactured by using such methods, as described in Patent Document 4, after a galvannealing, the particles of oxides containing Si or Mn are dispersed in the coating layer (Zn—Fe alloy coating layer) containing Zn—Fe alloy phases generated by reactions between Zn infiltrating from the coating layer during the galvannealing and Fe in the steel sheet.

In the Zn—Fe alloy coating layer, a plurality of Zn—Fe alloy phases such as ζ, $δ_1$, Γ, and $Γ_1$ phases are present in ascending order in terms of Fe content. In general, the Zn—Fe alloy phase is hard and brittle as the Fe content is increased. In addition, when the oxide particles are dispersed in the Zn—Fe alloy phase, the plastic deformability of the Zn—Fe alloy phase is reduced. Therefore, when stress is applied to the coating layer, the coating layer is more likely to be cracked or peeled off.

Regarding problems such as coating peeling or deterioration in powdering resistance that occur when a galvannealed steel sheet is manufactured by using a high-strength steel sheet as a starting sheet, for example, in Patent Document 6, there is disclosed a technique of, focusing on the shape of a structure including Si—Mn oxides and Zn—Fe intermetallic compounds generated at the interface between the coating layer and the steel sheet, the interface between the coating layer and the steel sheet to enhance adhesion between the coating layer and the steel sheet by controlling the size of convex-concave portions in the structure.

However, in the technique of Patent Document 6, during annealing before coating, a process of heating the steel sheet in an oxidizing atmosphere and holding the steel sheet in a reduction atmosphere for a predetermined time is employed. Therefore, the annealing atmosphere has to be strictly controlled in order to cause the state of the interface between the coating layer and the steel sheet to be in a predetermined state after the galvannealing.

In Patent Document 7, a technique of controlling the infiltration depth of Zn—Fe intermetallic compounds in a depth direction toward the steel sheet from the interface between the coating layer and the steel sheet to 10 μm or smaller to enhance powdering resistance and coating adhesion is disclosed. However, in recent years, higher workability has been required of a high-strength galvannealed steel sheet for automotive applications and the like. Therefore, it is difficult to ensure coating adhesion that can withstand heavy duty processing only by controlling the maximum infiltration depth of the Zn—Fe intermetallic compounds. For example, when a heavy duty forming process is performed using a die, powdering in which coatings on the surface are peeled off may occur, and in the related art, it is difficult to eliminate the occurrence of powdering.

PRIOR ART DOCUMENT

Patent Document

[Patent Document 1] Japanese Unexamined Patent Application, First Publication No. H05-59429
[Patent Document 2] Japanese Unexamined Patent Application, First Publication No. H04-276057
[Patent Document 3] Japanese Unexamined Patent Application, First Publication No. 2003-105514
[Patent Document 4] Japanese Patent No. 4718782
[Patent Document 5] Pamphlet of PCT International Publication No. WO2011/025042
[Patent Document 6] Japanese Unexamined Patent Application, First Publication No. 2011-127216
[Patent Document 7] Japanese Unexamined Patent Application, First Publication No. 2011-153367

DISCLOSURE OF THE INVENTION

Problems to be Solved by the Invention

The present invention has been made taking the above-described problems associated with a high-strength galvannealed steel sheet into consideration. That is, an object of the present invention is to provide a galvannealed steel sheet having excellent coating adhesion and a method of manufacturing the same.

Means for Solving the Problem

The inventors intensively examined a method of enhancing the coating adhesion of a galvannealed steel sheet (hereinafter, also referred to as "coated steel sheet"). As a result, it was newly found that in the vicinity of the interface between the coating layer and the steel sheet in a coated steel sheet after a coating treatment, (i) the state of a structure and oxides formed on the steel sheet side, and (ii) the morphology of an existent Zn—Fe alloy phase generated by infiltration of Zn into the steel sheet from the coating layer side have a significant effect on the enhancement of coating adhesion.

Furthermore, based on the findings, the inventors found that the above problems can be solved by controlling the structure in the vicinity of the interface between the coating layer and the steel sheet.

The present invention is based on the findings, and the summary is as follows.

(1) A galvannealed steel sheet according to an aspect of the present invention includes: a steel sheet; a coating layer on a surface of the steel sheet; and a mixed layer formed between the steel sheet and the coating layer, in which the steel sheet contains, in terms of mass %, C: 0.050% or more and 0.50% or less, and Mn: 0.01% or more and 3.00% or less, further contains one type or two or more types of Si: 0.01% or more and 3.00% or less, Al: 0.010% or more and 2.00% or less, and Cr: 0.01% or more and 2.00% or less, limits amounts of P, S, O, N, Ti, Nb, Mo, Cu, Ni, and B to P: 0.100% or less, S: 0.0200% or less, O: 0.0100% or less, N: 0.0100% or less, Ti: 0.150% or less, Nb: 0.150% or less, Mo: 1.00% or less, Cu: 2.00% or less, Ni: 2.00% or less, B: 0.0100% or less, satisfies the following Expression 1 when the Mn content, the Si content, the Al content, and the Cr content are respectively expressed by [Mn], [Si], [Al], and [Cr] in terms of mass %, and contains a remainder including Fe and unavoidable impurities, the coating layer is a galvannealed layer containing, in terms of mass %, Fe: 7.0% or more and 15.0% or less, Al: 0.01% or more and 1.00% or less, and a remainder including Zn and unavoidable impurities, and the mixed layer includes a base iron portion having fine grains having a size of greater than 0 μm and equal to or smaller than 2 μm, a Zn—Fe alloy phase, and oxides containing one or more types of Mn, Si, Al, and Cr, and in the mixed layer, the oxides and the Zn—Fe alloy phase are present in grain boundaries that form the fine grains and the Zn—Fe alloy phase is tangled with the base iron portion.

$$[Mn]+[Si]+[Al]+[Cr] \geq 0.4 \quad \text{(Expression 1)}$$

(2) In the galvannealed steel sheet described in (1), surface layer region on the coating layer which is a region of 1 μm or smaller from the surface of the coating layer may be a Zn—Fe alloy phase which contains a ζ phase that does not contain the oxides.

(3) In the galvannealed steel sheet described in (1) or (2), an average thickness of the mixed layer in a direction along a through-thickness direction of the steel sheet may be 10 μm or smaller.

(4) In the galvannealed steel sheet described in any one of (1) to (3), the Zn—Fe alloy phase in the mixed layer may have a shape that protrudes in a V-shape toward a thickness center of the steel sheet from the coating layer when viewed in a cross-section in the through-thickness direction of the steel sheet.

(5) In the galvannealed steel sheet described in any one of (1) to (4), when 10 or more visual fields of the mixed layer are observed along an interface between the mixed layer and the coating layer by using a scanning electron microscope at a magnification of 5,000-fold, the fine grains having the grain boundaries in which the Zn—Fe alloy phase is present in the mixed layer may be observed in 20% or greater of the entirety of the observed visual fields.

(6) In the galvannealed steel sheet described in any one of (1) to (5), the Zn—Fe alloy phase in the mixed layer may be generated by a reaction between Zn infiltrating from the coating layer during a galvannealing and Fe in the steel sheet.

(7) A method of manufacturing a galvannealed steel sheet according to another aspect of the present invention includes: a first temperature rising process of heating the steel sheet having the composition described in (1), in an atmosphere which contains 0.1 vol. % or more and 50 vol. % or less of hydrogen and a remainder including nitrogen and unavoidable impurities and has a dew point of higher than −30° C. and equal to or lower than 20° C. at a first temperature rising rate of 0.2° C./sec or higher and 6° C./sec or lower, which is an average temperature rising rate between 650° C. and 740° C.; a second temperature rising process of heating the steel sheet from 740° C. to an annealing temperature of 750° C. or higher and 900° C. or lower in the atmosphere same as that of the first temperature rising process, after the first temperature rising process; an annealing process of allowing the steel sheet to be retained in the atmosphere same as that of the second temperature rising process at the annealing temperature for 30 seconds or longer and 300 seconds or shorter, after the second temperature rising process; a cooling process of cooling the steel sheet after the annealing process; and a galvannealing process comprising of; a plating process of performing hot dip zinc plating on the steel sheet after the cooling process; and a heating process of performing a heating on the steel sheet at a temperature of 420° C. to 550° C. after the plating process.

(8) In the method of manufacturing a galvannealed steel sheet described in (7), the temperature in the heating process may be 420° C. or higher and 500° C. or lower.

(9) In the method of manufacturing a galvannealed steel sheet described in (7) or (8), a heavy duty grinding process of performing a heavy duty grinding under a condition of a grinding amount of 0.01 g/m$^2$ to 3.00 g/m$^2$ before the first temperature rising process may further be included.

(10) In the method of manufacturing a galvannealed steel sheet described in any one of (7) to (9), an average cooling rate between 740° C. and 650° C. in the cooling process may be 0.5° C./sec or higher.

(11) In the method of manufacturing a galvannealed steel sheet described in any one of (7) to (10), the annealing process may be performed in all radiant tube furnace of a continuous hot dip coating facility.

(12) In the method of manufacturing a galvannealed steel sheet described in any one of (7) to (11), the steel sheet may be immersed in a molten zinc bath which contains 0.01% or more and 1.00% or less of Al and has a bath temperature of 430° C. or higher and 500° C. or lower in the plating process.

(13) In the method of manufacturing a galvannealed steel sheet described in any one of (7) to (12), in the heating process, an average temperature rising rate between 420° C. and 460° C. may be 20° C./sec or higher and 100° C./sec or lower, and an average temperature rising rate from 460° C. to 550° C. may be 2° C./sec or higher and 40° C./sec or lower.

Effects of the Invention

According to the aspects of the present invention, a galvannealed steel sheet in which coating adhesion is enhanced compared to that in the related art can be provided.

EMBODIMENTS OF THE INVENTION

Figure 1A:
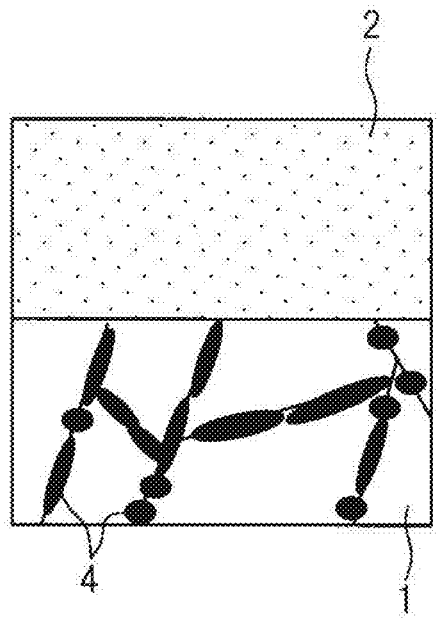
FIG. 1A is a view schematically showing a mechanism of significantly enhancing coating adhesion and is a view showing an aspect in which zinc plating is performed on a steel sheet having a fine structure in which oxides are present in grain boundaries.

Hereinafter, a galvannealed steel sheet according to an embodiment of the present invention will be described in detail.

The galvannealed steel sheet according to the embodiment of the present invention (hereinafter, also referred to as a coated steel sheet according to this embodiment) includes: a steel sheet; a coating layer on the surface of the steel sheet; and a mixed layer formed between the steel sheet and the coating layer, in which the steel sheet contains, in terms of mass %, C: 0.050% or more and 0.50% or less, and Mn: 0.01% or more and 3.00% or less, further contains one type or two or more types of Si: 0.01% or more and 3.00% or less, Al: 0.010% or more and 2.00% or less, and Cr: 0.01% or more and 2.00% or less, limits the amounts of P, S, O, N, Ti, Nb, Mo, Cu, Ni, and B to P: 0.100% or less, S: 0.0200% or less, O: 0.0100% or less, N: 0.0100% or less, Ti: 0.150% or less, Nb: 0.150% or less, Mo: 1.00% or less, Cu: 2.00% or less, Ni: 2.00% or less, and B: 0.0100% or less, satisfies the following Expression 1 when the Mn content, the Si content, the Al content, and the Cr content are respectively expressed by [Mn], [Si], [Al], and [Cr] in terms of mass %, and contains a remainder including Fe and unavoidable impurities, the coating layer is a galvannealed layer containing, in terms of mass %, Fe: 7.0% or more and 15.0% or less, Al: 0.01% or more and 1.00% or less, and a remainder including Zn and unavoidable impurities, and the mixed layer includes a base iron portion having fine grains having a size of greater than 0 μm and equal to or smaller than 2 μm, a Zn—Fe alloy phase, and oxides containing one or more types of Mn, Si, Al, and Cr, and in the mixed layer, the oxides and the Zn—Fe alloy phase are present in grain boundaries that form the fine grains and the Zn—Fe alloy phase is tangled with the base iron portion.

$$[Mn]+[Si]+[Al]+[Cr] \geq 0.4 \quad \text{(Expression 1)}$$

The thickness (mm) of the steel sheet subjected to zinc plating is not particularly limited. Typically, the thickness of the steel sheet subjected to zinc plating is 0.4 mm to 3.2 mm. However, in consideration of the load or productivity of a rolling mill, the thickness is preferably 1.0 mm to 3.2 mm.

First, a reason that the chemical composition of the steel sheet which is a material to be coated (may also be referred to as a steel sheet according to this embodiment) in the coated steel sheet according to this embodiment is limited will be described. Here, % associated with the composition represents mass %.

C: 0.050% or more and 0.5% or Less

C is an effective element for ensuring the strength of steel. However, when the C content is less than 0.050%, the strength enhancing effect may not be expected. On the other hand, when the C content is more than 0.5%, weldability is deteriorated and the utilization of the steel sheet of the present invention is degraded. Therefore, the C content is 0.050% or more and 0.5% or less. The C content is preferably 0.100% or more and 0.4% or less.

Mn: 0.01% or more and 3.00% or Less

Mn is an effective element for ensuring the strength of steel. In addition, Mn is an element that forms oxides which suppress coarsening of grains in the vicinity of the surface of the steel sheet during annealing. However, when the Mn content is less than 0.01%, an effect of added Mn may not be expected. On the other hand, when the Mn content is more than 3.00%, weldability is deteriorated and the utilization of the steel sheet of the present invention is degraded. Therefore, the Mn content is 0.01% or more and 3.00% or less. The Mn content is preferably 0.07% or more and 3.00% or less.

Furthermore, the steel sheet needs to contain one type or two or more types selected from Si, Al, and Cr in the following ranges.

Si: 0.01% or more and 3.00% or Less

Si is an element that ensures the strength of steel. In addition, Si is an element that forms oxides which limit coarsening of grains in the vicinity of the surface of the steel sheet during annealing. In order to obtain this effect, 0.01% or more of Si needs to be contained in the steel. Therefore, the lower limit of the Si content in a case where Si is added is 0.01%. On the other hand, when the Si content is more than 3.00%, coarse oxides are generated, and the coating layer is easily peeled off. Therefore, the upper limit of the Si content is 3.00%. The upper limit of Si content is preferably 2.00%.

Al: 0.010% or more and 2.00% or Less

Al is an element that deoxidizes steel. In addition, Al is an element that forms oxides which limit coarsening of grains in the vicinity of the surface of the steel sheet during annealing. In order to obtain this effect, 0.010% or more of Al needs to be contained in the steel. Therefore, the lower limit of the Al content in a case where Al is added is 0.010%. On the other hand, when the Al content is more than 2.00%, coarse inclusions and oxides are generated, workability is degraded, and the coating layer is easily peeled off. Therefore, the upper limit of the Al content is 2.00%. From the viewpoint of ensuring high workability, a preferable upper limit thereof is 1.50%.

Cr: 0.01% or more and 2.00% or Less

Cr is an effective element for ensuring the strength of steel without damaging the workability, particularly, the elongation of the steel sheet. In addition, Cr is an element that forms oxides which limit coarsening of grains in the vicinity of the surface of the steel sheet during annealing. In order to obtain this effect, 0.01% or more of Cr needs to be contained in the steel. Therefore, the lower limit of the Cr content in a case where Cr is added is 0.01%. On the other hand, when the Cr content is more than 2.00%, the grain boundaries are embrittled due to boundary segregation, and the alloying rate is reduced. Therefore, the upper limit of the Cr content is 2.00%. A preferable upper limit thereof is 1.50%.

Mn+Si+Al+Cr: 0.400% or more

As described above, all of Mn, Si, Al, and Cr are elements that form oxides which limit coarsening of grains in the vicinity of the surface of the steel sheet during annealing. However, when Mn+Si+Al+Cr is less than 0.400%, the amount of generated oxides is insufficient, and grains in the vicinity of the surface of the steel sheet are coarsened. Accordingly, a desired fine structure is not obtained. Therefore, Mn+Si+Al+Cr is more than 0.400%. Mn+Si+Al+Cr is preferably 0.900% or more. The upper limit thereof is not particularly limited and may be the sum of the upper limits of the elements. However, in order to limit excessive generation of oxides, the upper limit thereof is preferably 6.000% or less.

Here, oxides which limit coarsening of grains as described above are oxides of Mn, Si, Al, or Cr, or composite oxides containing two or more types of Mn, Si, Al, and Cr.

Examples of the oxides include Si oxides, Mn oxides, Si—Mn oxides, Al oxides, Al—Si composite oxides, Al—Mn composite oxides, Al—Si—Mn composite oxides, Cr oxides, Cr—Si composite oxides, Cr—Mn composite oxides, Cr—Si—Mn composite oxides, Cr—Al composite oxides, Cr—Al—Si composite oxides, Cr—Al—Mn composite oxides, and Cr—Al—Mn—Si composite oxides. In addition, the oxides may also contain Fe.

The size of the oxides is preferably not greater than 1 μm in terms of average equivalent circle diameter so as not to deteriorate the elongation, and is preferably 10 nm or greater in order to exhibit an effect of limiting the movement of the grain boundaries of the steel sheet. The size of the oxides may be obtained by observing a cross-section polished sample at a SEM (scanning electron microscope) magnification of 50,000-fold and obtaining equivalent circle diameters through image analysis. The number of oxides is not particularly limited, and it is preferable that one or more oxides are present in a length of 100 μm of the cross-section at a depth d (μm) in the through-thickness direction during the cross-sectional observation.

The steel sheet according to this embodiment is based on the composition containing the above-mentioned elements and the remainder including iron and unavoidable impurities. However, the steel sheet may further contain P, S, O, N, Ti, Nb, Mo, Cu, Ni, and B in the following content ranges as necessary. The lower limits of the elements are 0%. However, in order to obtain desired effects, the following lower limits may be employed.

P: 0.100% or Less

P is an element that increases the strength of steel and is also an element that segregates to a thickness center portion of the steel sheet and causes embrittlement of welds. Therefore, the P content is limited to 0.100% or less. The P content is preferably 0.080% or less. The lower limit thereof is not particularly limited. However, in order to ensure an effect of enhancing strength, the steel preferably contains 0.001% or more of P.

S: 0.0200% or Less

S has an adverse effect on weldability and manufacturability during casting and hot rolling. Therefore, the upper limit of the S content is 0.0200%. In addition, S is bonded to Mn and forms coarse MnS and thus reduces ductility and stretch flangeability. Therefore, the upper limit thereof is preferably 0.0050% or less and more preferably 0.0025% or less. The effects of the present invention are exhibited even when the lower limit of the S content is not particularly defined. However, setting the S content to be less than 0.0001% causes a significant increase in manufacturing costs, and thus the lower limit thereof is preferably is 0.0001% or more.

O: 0.0100% or Less

O forms oxides and deteriorates ductility and stretch flangeability, and thus the O content needs to be limited. When the O content is more than 0.0100%, stretch flangeability is significantly deteriorated, and thus the upper limit of the O content is 0.0100%. The O content is preferably 0.0080% or less and more preferably 0.0060% or less. The effects of the present invention are exhibited even when the lower limit of the O content is not particularly defined. However, setting the O content to be less than 0.0001% causes a significant increase in manufacturing costs, and thus the lower limit thereof is preferably 0.0001% or more.

N: 0.0100% or Less

N forms coarse nitrides and deteriorates ductility and stretch flangeability, and thus the N content needs to be limited. When the N content is more than 0.0100%, this tendency becomes significant, and thus the range of the N content is set to be 0.0100% or less. In addition, N causes the generation of blowholes during welding and thus N content is preferably as small as possible. The effects of the present invention are exhibited even when the lower limit of the N content is not particularly defined. However, setting the N content to be less than 0.0001% causes a significant increase in manufacturing costs, and thus the lower limit thereof is preferably 0.0001% or more.

Ti: 0.150% or Less

Ti is an element which contributes to an increase in the strength of the steel sheet (base metal steel sheet) which is a material to be coated, due to precipitate strengthening, fine grain strengthening through the limitation of the growth of ferrite grains, and dislocation strengthening through the limitation of recrystallization. However, when the Ti content is more than 0.150%, a large amount of carbonitrides are precipitated, and thus formability is deteriorated. Therefore, the Ti content is preferably 0.150% or less. From the viewpoint of formability, the Ti content is more preferably 0.120% or less, and even more preferably 0.100% or less. The effects of the present invention are exhibited even when the lower limit of the Ti content is not particularly defined. However, in order to sufficiently obtain the effect of increasing strength by Ti, the Ti content is preferably 0.005% or more. For an increase in the strength of the base metal steel sheet, the Ti content is more preferably 0.010% or more, and even more preferably 0.015% or more.

Nb: 0.150% or Less

Nb is an element which contributes to an increase in the strength of the base metal steel sheet due to precipitate strengthening, fine grain strengthening through the limitation of the growth of ferrite grains, and dislocation strengthening through the limitation of recrystallization. However, when the Nb content is more than 0.150%, a large amount of carbonitrides are precipitated, and thus formability is deteriorated. Therefore, the Nb content is preferably 0.150% or less. From the viewpoint of formability, the Nb content is more preferably 0.120% or less, and even more preferably 0.100% or less. The effects of the present invention are exhibited even when the lower limit of the Nb content is not particularly defined. However, in order to sufficiently obtain the effect of increasing strength by Nb, the Nb content is preferably 0.005% or more. For an increase in the strength of the base metal steel sheet, the Nb content is more preferably 0.010% or more, and even more preferably 0.015% or more.

Mo: 1.00% or Less

Mo is an element which limits phase transformation at a high temperature and is effective in increasing strength. Therefore, Mo may be added instead of a portion of C and/or Mn. When the Mo content is more than 1.00%, hot workability is damaged and thus productivity is reduced. Therefore, the Mo content is preferably 1.00% or less. The effects of the present invention are exhibited even when the lower limit of the Mo content is not particularly defined. However, in order to sufficiently obtain the effect of increasing strength by Mo, the Mo content is preferably 0.01% or more.

Cu: 2.00% or Less

Cu is an element which is present in steel as fine particles and increases strength. Therefore, Cu may be added instead of a portion of C and/or Mn. When the Cu content is more than 2.00%, weldability is damaged, and thus the Cu content is preferably 2.00% or less. The effects of the present invention are exhibited even when the lower limit of the O content is not particularly defined. However, in order to sufficiently obtain the effect of increasing strength by Cu, the Cu content is preferably 0.01% or more.

Ni: 2.00% or Less

Ni is an element which limits phase transformation at a high temperature and is effective in increasing strength. Therefore, Ni may be added instead of a portion of C and/or Mn. When the Ni content is more than 2.00%, weldability is damaged, and thus the Ni content is preferably 2.00% or less. The effects of the present invention are exhibited even when the lower limit of the Ni content is not particularly defined. However, in order to sufficiently obtain the effect of increasing strength by Ni, the Ni content is preferably 0.01% or more.

B: 0.0100% or Less

B is an element which strengthens grain boundaries and improves secondary workability. However, B is also an element that deteriorates coating properties. Therefore, the upper limit thereof is 0.0100%, and preferably 0.0075%. The lower limit thereof is not particularly limited, and is preferably 0.0001% or more in order to ensure the improvement effect.

The effects of the present invention are exhibited even when the steel sheet according to this embodiment further contains, as unavoidable impurity elements other than the above-mentioned elements, one type or two or more types of W, Co, Sn, V, Ca, and REM.

Next, a reason that the composition of the coating layer formed on the surface of the steel sheet in the coated steel sheet according to this embodiment is limited will be described. Here, % associated with the composition represents mass %.

Fe: 7.0% or more and 15.0% or Less

When the Fe content in the coating layer is less than 7.0%, portions which are not alloyed are generated and thus the appearance of the surface is poor, and flaking resistance during pressing is deteriorated. On the other hand, when the Fe content in the coating layer is more than 15.0%, over-alloyed portions are generated, and powdering resistance during pressing is deteriorated. Therefore, the Fe content (Fe concentration) in the coating layer is 7.0% or more and 15.0% or less. Here, the Fe content in the coating layer indicates the ratio (mass %) of contained Fe, in a case where the sum of the coating amounts of the Zn—Fe alloy phase that is present in the galvannealed layer and the mixed layer, is the denominator.

Al: 0.01% to 1.00%

When the Al content (Al concentration) in the coating layer is less than 0.01%, an alloying reaction of Zn and Fe excessively proceeds in the coating layer during the manufacture of the steel sheet. In addition, when the Al content (Al concentration) in the coating layer is more than 1.00%, an effect of limiting the Zn—Fe alloying reaction by Al is significantly exhibited, and thus the line speed has to be reduced in order to allow the Zn—Fe reaction to proceed, resulting in the deterioration of productivity. Therefore, the Al content in the coating layer is 0.01% or more and 1.00% or less.

In the coated steel sheet according to this embodiment, the mixed layer, which contains the base iron portion, the Fe—Zn phase, and the oxides containing one or more types of Mn, Si, Al, and Cr, is formed between the above-described steel sheet and the coating layer by the galvannealing.

Next, the structural characteristics of the coated steel sheet according to this embodiment will be described.

When the galvannealed steel sheet is manufactured, in a case where annealing is performed on the steel sheet which is a material to be coated in an all radiant tube furnace (RTF) type line, by adjusting the oxygen potential in the annealing furnace, easily oxidizable elements Mn, Si, Al, and Cr in the steel sheet can be oxidized and form oxides while oxide films that are present on the surface of the steel sheet are reduced.

The structure of the steel sheet before annealing is typically an as rolled structure and in many cases, the grains thereof are formed of fine grains of the submicron order. When the fine structure is heated in the annealing furnace and reaches a certain temperature, grain growth occurs and the grains gradually coarsen.

However, when the oxygen potential or the temperature rising pattern in the annealing furnace is adjusted, Mn, Si, Al, and Cr (easily oxidizable elements) in the steel sheet can be preferentially oxidized (preferential oxidation) in the grain boundaries of the steel sheet before the grains in the vicinity of the surface of the steel sheet coarsen.

Oxides generated through preferential oxidation limit the movement of the grain boundaries. Therefore, by adjusting the oxygen potential or the temperature rising pattern in the annealing furnace as described above, a fine structure in which oxides are present in the grain boundaries can be formed while maintaining the fine rolled structure in the vicinity of the surface of the steel sheet being fine.

In the coated steel sheet according to this embodiment, hot dip zinc plating is performed on the steel sheet after annealing. Accordingly, the coating layer is formed on the surface of the steel sheet. Moreover, in the coated steel sheet according to this embodiment, the heating is performed on the steel sheet having the coating layer. By the heating, the mixed layer is formed between the steel sheet and the alloyed coating layer (galvannealed layer). The mixed layer is formed as Zn infiltrates into the grain boundaries of the fine structure of the steel sheet from the coating layer. Therefore, the mixed layer includes the base iron portion (the steel sheet portion), the Zn—Fe alloy phase, and the oxides formed in the grain boundaries of the steel sheet during annealing. In addition, the Zn—Fe alloy phase in the mixed layer is generated as Zn infiltrates from the coating layer into the grain boundaries of the fine structure in the steel sheet obtained due to the action of limiting the grain growth of the oxides formed during annealing and Zn infiltrating from the coating layer reacts with Fe in the steel sheet. In addition, since the Zn—Fe alloy phase in the mixed layer is formed along the grain boundaries of the steel sheet, the Zn—Fe alloy phase and the base iron portion are in a tangled shape. Therefore, the adhesion between the steel sheet and the coating layer is significantly enhanced. Particularly, in the coated steel sheet according to this embodiment, the Zn—Fe alloy phase in the mixed layer preferably has a shape that protrudes in a V-shape (so-called wedge shape) toward the thickness center of the steel sheet from the coating layer when viewed in a cross-section in the through-thickness direction. This adhesion enhancing mechanism will be described with reference to the drawings.

Figure 1B:
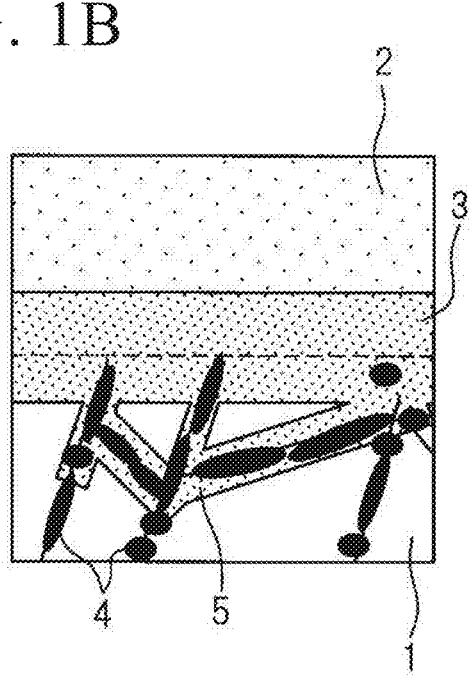
FIG. 1B is a view schematically showing the mechanism of significantly enhancing coating adhesion and is a view showing the form of a V-shaped (wedge-shaped) Zn—Fe alloy phase generated in the vicinity of the oxides that are present in the grain boundaries by reactions between Zn infiltrating from a coating layer and Fe in the steel sheet (subsequent to FIG. 1A).
Figure 1C:
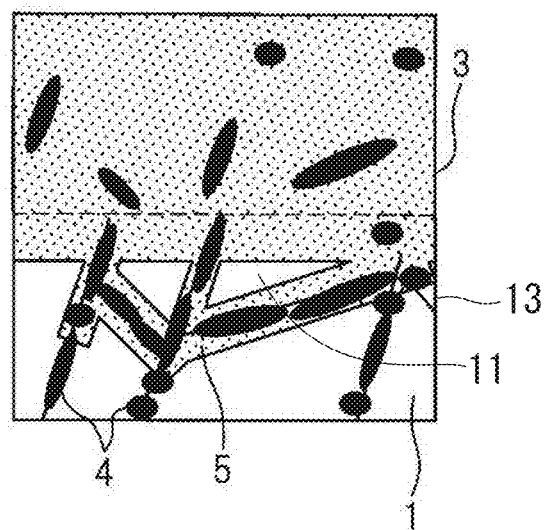
FIG. 1C is a view schematically showing the mechanism of significantly enhancing coating adhesion and is a view showing an aspect of a Zn—Fe coating layer formed by the galvannealing (subsequent to FIG. 1B).

FIGS. 1A to 1C schematically illustrate a mechanism of significantly enhancing coating adhesion. FIG. 1A shows an aspect in which zinc plating is performed on the steel sheet having the fine structure in which the oxides are present in the grain boundaries (containing the oxides). FIG. 1B shows an aspect of the wedge-shaped Zn—Fe alloy phase generated in the vicinity of the oxides that are present in the grain boundaries by reactions between Zn infiltrating from the coating layer and Fe in the steel sheet. FIG. 1C shows an aspect of a Zn—Fe coating layer (alloy coating layer) formed by the galvannealing.

As shown in FIG. 1A, hot dip zinc plating is performed on the steel sheet having a fine structure 1 in which oxides 4 are present in the grain boundaries, thereby forming a coating layer 2. The oxides 4 are present in most of the grain boundaries, and Zn easily infiltrates into the grain boundaries in which the oxides 4 are present from the coating layer 2. By a heating after the coating, Zn infiltrating from the coating layer 2 is bonded to Fe in the steel sheet in some of the grain boundaries in which the oxides 4 are present. In addition, as shown in FIG. 1B, the Zn—Fe alloy phase (intermetallic compounds) 5 which is present between the steel sheet and the coating layer and has a shape that protrudes in a V-shape (wedge shape) toward the steel sheet is formed in the around of the oxides 4.

Furthermore, as shown in FIG. 1C, as the heating proceeds, the coating layer 2 is alloyed from a side close to the interface with the steel sheet, thereby forming an alloy coating layer (galvannealed layer) 3. In addition, the alloy coating layer 3 incorporates the fine structure 1 in the vicinity of the surface of the steel sheet and grows toward the steel sheet. This region becomes a mixed layer 13 described above. The inventors found that the mixed layer 13 is present between the alloy coating layer and the steel sheet, in the mixed layer since the Zn—Fe alloy phase 5 (intermetallic compounds) is tangled with a base iron portion 11, the alloy coating layer 3 and the steel sheet are securely bonded to each other, and thus the adhesion between the alloy coating layer 3 and the steel sheet is dramatically increased. This point is the finding for the base of the present invention.

As described above, by performing the heating, the Zn—Fe alloy phase is generated in not only the mixed layer 13 but also the alloy coating layer 3. It is preferable that the Zn—Fe alloy phase in the mixed layer is formed as described above. Furthermore, the inventors also found that when the Zn—Fe alloy phase in a coating surface layer region which is a region of 1 μm or smaller from the surface of the alloy coating layer 3 (on the opposite side to the steel sheet) in the structure 3 is a Zn—Fe alloy phase which contains a ζ phase that does not contain the oxides, strength in adhesion to other members can be further increased.

As described above, a portion of the fine structure in the vicinity of the surface of the steel sheet is incorporated into the alloy coating layer from the surface side of the steel sheet and becomes the mixed layer by the heating. The inventors found that controlling the process of internal oxidation by adjusting the annealing atmosphere and the heating rate is important to form the mixed layer. The adjustment of the annealing atmosphere and the heating rate will be described later.

In the steel sheet, when the fine structure in which the oxides are present in the grain boundaries is formed to a certain thickness, alloying of the interface between the steel sheet and the coating layer proceeds rapidly and a desired mixed layer is obtained after the heating ends.

Figure 2A:
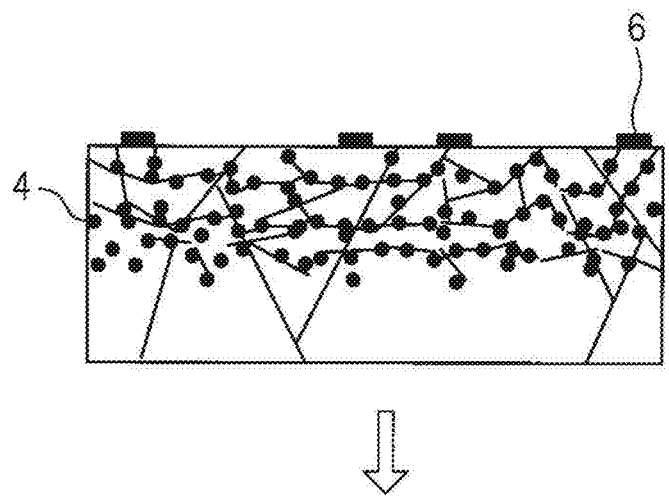
FIG. 2A is a view showing a correlation between "the fine structure in which the oxides are present in the grain boundaries" formed in the vicinity of the surface of the steel sheet and the coating layer, and is a view schematically showing an aspect of "the fine structure in which the oxides are present in the grain boundaries" formed in the vicinity of the surface of the steel sheet.
Figure 2B:
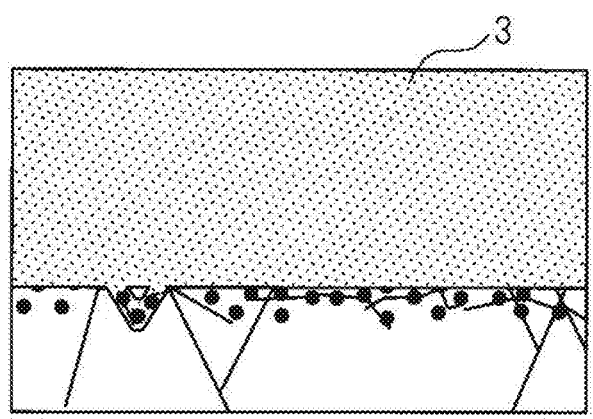
FIG. 2B is a view showing a correlation between "the fine structure in which the oxides are present in the grain boundaries" formed in the vicinity of the surface of the steel sheet and the coating layer, and is a view schematically showing an aspect of "the fine structure in which the oxides are present in the grain boundaries" after coating.

FIGS. 2A and 2B illustrate a correlation between "the fine structure in which the oxides are present in the grain boundaries" formed in the vicinity of the surface of the steel sheet and the coating layer. FIG. 2A schematically shows an aspect of "the fine structure in which the oxides are present in the grain boundaries" formed in the vicinity of the surface of the steel sheet, and FIG. 2B schematically shows an aspect of "the fine structure in which the oxides are present in the grain boundaries" in the mixed layer.

When the coating layer is formed and the heating is performed on the surface of the steel sheet shown in FIG. 2A, the alloy coating layer incorporates "the fine structure in which the oxides are present in the grain boundaries" and grows toward the steel sheet as shown in FIG. 2B. As a result, in the coated steel sheet according to this embodiment, the mixed layer including "the fine structure in which the oxides are present in the grain boundaries" is formed. In addition, the Zn—Fe phase is formed in the grain boundaries.

The "wedge-shaped Zn—Fe alloy phase" that is present in the grain boundaries of "the fine structure in which the oxides are present in the grain boundaries" in the mixed layer has a function of structurally connecting the alloy coating layer and the steel sheet to each other, and thus the coating adhesion of the steel sheet of the present invention is dramatically enhanced.

In order to ensure significant enhancement of the coating adhesion, in the coated steel sheet according to this embodiment, the above-described mixed layer is formed between the steel sheet and the coating layer. In addition, the above-described mixed layer is formed to include the base iron portion having fine grains (fine structure) having a size of greater than 0 μm and equal to or smaller than 2 μm, the Zn—Fe alloy phase, and oxides containing one or more types of Mn, Si, Al, and Cr. Furthermore, in the above-described mixed layer, the oxides and the Zn—Fe alloy phase are present in the grain boundaries that form the fine grains, and the Zn—Fe alloy phase is formed in a shape of being tangled with the base iron portion.

As described above, the structure of the steel sheet before annealing is typically an as rolled structure and in many cases, the grains thereof are formed of fine grains of the submicron order. On the basis of this, in order to form a sufficient amount of "wedge-shaped Zn—Fe alloy phase" in the grain boundaries in the mixed layer, the fine structure of the base iron portion was specified to a fine structure having fine grains with a grain size of 2 μm or smaller. The grain size of the fine structure is preferably 1 μm or smaller. In addition, although the lower limit thereof does not need to be particularly specified, due to the necessity for the presence of the fine structure, the lower limit thereof is greater than 0 μm.

The mixed layer 13 is more brittle than the steel sheet 1 and the alloy coating layer 3. Therefore, when the thickness of the mixed layer is greater than 10 μm, cracking easily occurs during bending. Therefore, the thickness of the mixed layer is preferably 10 μm or smaller.

In order to ensure sufficient bendability, the thickness of the mixed layer is more preferably 5 μm or smaller.

In order to obtain sufficient coating adhesion, when 10 or more visual fields of the mixed layer are observed along the interface between the mixed layer and the coating layer by using a scanning electron microscope at a magnification of 5,000-fold, one or more fine grains having the grain boundaries in which the Zn—Fe alloy phase is present are observed in 20% or greater of the entirety of the observed visual fields.

In a case where the ratio of the visual fields in which the fine grains having the grain boundaries in which the Zn—Fe alloy phase is present are observed is lower than 20%, sufficient coating adhesion can be ensured in a press working range in which a typical vehicle internal plate is postulated. However, in a case where more heavy duty work such as bending, unbending, or sliding is applied, for example, a vehicle external plate is postulated, there is concern that coating adhesion may be insufficient, and thus there is a possibility that applications and uses of the present invention may be limited, which is not preferable.

Figure 5:
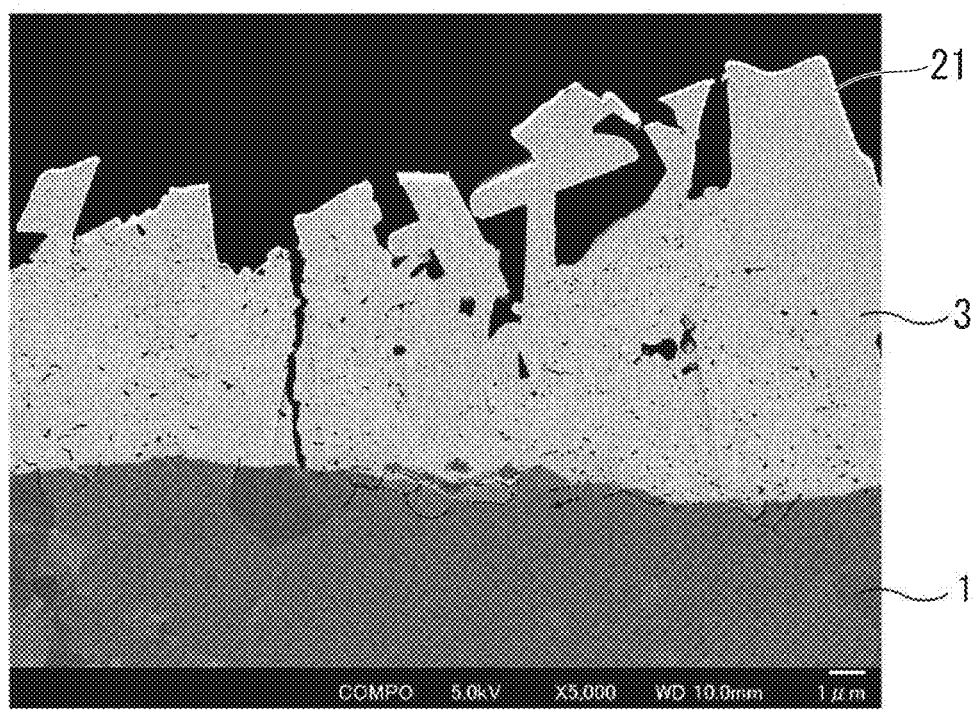
FIG. 5 is a view showing a ζ phase generated when the galvannealing is performed at a low temperature.

In a case of further enhancing adhesion strength, it is preferable that by reducing the temperature in the heating process, the surface layer region on the coating layer which is a region of 1 μm or smaller from the surface of the coating layer has the Zn—Fe alloy phase which contains a ζ phase 21 that does not contain the oxides, as shown in FIG. 5.

In the Zn—Fe alloy phase, the ζ phase is relatively soft and does not contain the oxides, and thus has a certain degree of deformability. Therefore, when stress is applied to the surface layer of the coating layer, the surface layer region on the coating layer can be deformed to a certain degree. Accordingly, when the surface layer region on the coating layer is adhered to another member with an adhesive, the adhesion to the member is dense.

The reason that the ζ phase does not contain oxides is not clear. However, it is thought that the ζ phase is not generated during the heating, and a Zn—Fe alloy phase containing the ζ phase is precipitated by a reaction between Fe eluted from the surface of the steel sheet into a molten zinc bath during immersion into the molten zinc bath and Zn in the bath.

Next, a method of manufacturing the coated steel sheet according to this embodiment will be described.

The manufacturing of the coated steel sheet according to this embodiment includes: a first temperature rising process of heating the steel sheet having the above-described composition in an atmosphere which contains 0.1 vol. % or more and 50 vol. % or less of hydrogen and the remainder including nitrogen and unavoidable impurities and has a dew point of higher than −30° C. and equal to or lower than 20° C. at a first temperature rising rate of 0.2° C./sec or higher and 6° C./sec or lower, which is an average temperature rising rate between 650° C. and 740° C.; a second temperature rising process of heating the steel sheet from 740° C. to an annealing temperature of 750° C. or higher and 900° C. or lower in the atmosphere same as that of the first temperature rising process, after the first temperature rising process; an annealing process of allowing the steel sheet to be retained in the atmosphere same as that of the second temperature rising process at the annealing temperature for 30 seconds or longer and 300 seconds or shorter after the second temperature rising process; a cooling process of cooling the steel sheet after the annealing process; and a galvannealing process comprising of a plating process of performing hot dip zinc plating on the steel sheet after the cooling process; and a heating process of performing a heating on the steel sheet at a temperature of 420° C. to 550° C. after the plating process.

It is preferable that the annealing is performed in an all radiant tube furnace of a continuous hot dip coating facility. The reduction annealing atmosphere before coating is an atmosphere in which the ratio of hydrogen to the atmosphere gas is 0.1 vol. % to 50 vol. % and the remainder contains nitrogen and unavoidable impurities. When the hydrogen content is less than 0.1 vol. %, oxide films that are present on the surface of the steel sheet cannot be sufficiently reduced, and coating wettability cannot be ensured. Therefore, the hydrogen content of the reduction annealing atmosphere is 0.1 vol. % or more.

When the hydrogen content in the reduction annealing atmosphere is more than 50 vol. %, the dew point (corresponding to the water vapor pressure $PH_2O$) thereof is excessively increased, and thus there is a need to introduce a facility that prevents dew condensation. The introduction of a new facility leads to an increase in production cost, and thus the hydrogen content of the reduction annealing atmosphere is 50 vol. % or less. The hydrogen content is preferably 0.1 vol. % or more and 40 vol. % or less.

The dew point of the annealing reduction atmosphere is higher than −30° C. and equal to or lower than 20° C. When the dew point thereof is −30° C. or lower, it becomes difficult to ensure a necessary oxygen potential for internally oxidizing easily oxidizable elements such as Si and Mn are in steel. The dew point thereof is preferably −25° C. or higher. On the other hand, when the dew point thereof is higher than 20° C., dew concentration significantly occurs in a pipe through which the reduction gas flows, and thus stable atmosphere control is difficult. Therefore, the dew point thereof is 20° C. or lower. The dew point thereof is preferably 15° C. or lower.

Furthermore, it is preferable that the $\log(PH_2O/PH_2)$ of the reduction annealing atmosphere is adjusted to be 0 or lower. When the $\log(PH_2O/PH_2)$ thereof is increased, alloying is accelerated. However, when the $\log(PH_2O/PH_2)$ thereof is higher than 0, oxides that are generated on the surface of the steel sheet before annealing cannot be sufficiently reduced. As a result, coating wettability cannot be ensured. Therefore, the upper limit of the $\log(PH_2O/PH_2)$ thereof is preferably 0. The upper limit thereof is more preferably −0.1 or lower.

The composition and the dew point of the reduction annealing atmosphere and the heating rate and the annealing temperature of the steel sheet are important to allow the oxides and the Zn—Fe alloy phase to be present in the grain boundaries that form the fine grain in the mixed layer and to form the mixed layer in which the Zn—Fe alloy phase in the mixed layer is tangled with the base iron portion.

The steel sheet is heated in the reduction annealing atmosphere at a first temperature rising rate of 0.2° C./sec or higher and 6° C./sec or lower, which is an average temperature rising rate between 650° C. and 740° C. (first temperature rising process). After the first temperature rising process, the steel sheet is heated from 740° C. to an annealing temperature of 750° C. or higher and 900° C. or less in the atmosphere (second temperature rising process). When the first temperature rising rate (heating rate) is higher than 6° C./sec, the temperature rising rate is too high and grains in the steel sheet are coarsened before internal oxidation sufficiently proceeds. Accordingly, a structural morphology needed for the present invention is not obtained. Therefore, the first temperature rising rate is 6° C./sec or lower. The first temperature rising rate is preferably 4° C./sec or lower. The lower limit thereof is preferably 0.2° C./sec or higher from the viewpoint of productivity.

The temperature rising rate in the second temperature rising process does not need to be particularly limited. However, from the viewpoint of productivity, it is preferable that the temperature rising rate is equal to or higher than 0.2° C./sec and equal to or lower than the upper limit of the facility ability. By controlling the heating rate to 740° C. as described above, oxides are generated in a region which is to become the mixed layer when coating is performed in a subsequent process before transformation due to internal oxidation in ferrite having a high diffusion rate. Therefore, it is thought that the above-described mixed layer can be generated.

After the second temperature rising process, annealing in which the steel sheet is retained at an annealing temperature of 750° C. or higher and 900° C. or less for 30 seconds or longer and 300 seconds or shorter is performed (annealing process). Here, retention does not represent only isothermal holding and may also allow a temperature change in the above temperature range. When the annealing temperature is lower than 750° C., the oxides film generated on the surface of the steel sheet before the annealing cannot be sufficiently reduced, and there may be cases where coating wettability cannot be ensured. When the annealing temperature is higher than 900° C., press formability is deteriorated, and a necessary heat amount for heating is increased, resulting in an increase in manufacturing costs. In addition, at an annealing temperature of 900° C. or higher, coarsening of the grains is likely to significantly proceed, and there is concern that the fine structure that is formed on the surface of the steel sheet once may be dissipated. Therefore, the annealing temperature is 750° C. or higher and 900° C. or lower. A preferable annealing temperature is 760° C. or higher and 880° C. or lower.

After the annealing process, cooling is performed (cooling process). The cooling rate is not particularly limited. However, from the viewpoint of material properties, an average cooing rate between 740° C. and 650° C. is 0.5° C./sec or higher. When the upper limit of the cooling rate is 20° C./sec, the grain boundaries in a region which becomes the mixed layer when coating is subsequently performed are likely to undergo component segregation and subsequently, the mixed layer is easily generated. Therefore, it is preferable that an average cooing rate between 740° C. and 650° C. is 0.5° C./sec or higher and 20° C./sec or lower. The average cooing rate is more preferably 15° C./sec or lower and even more preferably 6° C./sec or lower.

Regarding the coated steel sheet according to this embodiment, hot dip zinc plating is performed on the steel sheet subjected to the cooling after the annealing in order to form the coating layer (plating process). It is preferable that hot dip zinc plating is performed by using a molten zinc bath containing 0.01% to 1.00% of Al at a bath temperature of 430° C. to 500° C.

When the Al content is less than 0.01%, the Zn—Fe alloy layer in the molten zinc bath rapidly grows, there may be cases where a desired coating layer cannot be formed, for example, the Fe concentration in the coating layer is excessively increased, only by controlling an immersion time depending on the steel type. In addition, the amount of bottom dross generated in the molten zinc bath is increased, and surface defects caused by the dross are generated. Therefore, there is concern that failure in the external appearance may occur in the steel sheet.

On the other hand, when the Al content is more than 1.00%, an effect of limiting the Zn—Fe alloying reaction by Al is significantly exhibited, and thus the line speed has to be reduced in order to allow the Zn—Fe reaction to proceed, resulting in the deterioration of productivity.

When the bath temperature of the molten zinc bath is lower than 430° C., since the melting point of zinc is about 420° C., there is concern that bath temperature control is unstable and a portion of the bath may solidify. When the bath temperature thereof is higher than 500° C., the life span of facilities such as a sink roll or a zinc pot is reduced. Therefore, the bath temperature of the molten zinc bath is preferably 430° C. to 500° C. The bath temperature thereof is more preferably 440° C. to 480° C.

A coating amount is not particularly limited, and is preferably 1 µm or greater in terms of one surface coating amount from the viewpoint of corrosion resistance. In addition, the one surface coating amount is preferably 20 µm or smaller from the viewpoint of workability, weldability, and economic efficiency.

The heating is performed at 420° C. to 550° C. (heating process). When the temperature in the heating process is lower than 420° C., the progress of alloying is delayed, and there is a possibility that a Zn layer may remain on the coating surface layer. The temperature in the heating process is preferably 450° C. or higher. On the other hand, when the temperature in the heating process is higher than 550° C., alloying excessively proceeds, and a Γ phase which is brittle is thickened at the interface between the coating and the steel sheet, and thus coating adhesion during work is degraded.

It is preferable that, during the heating, the average temperature rising rate from 420° C. to 460° C. is 20° C./sec or higher and 100° C./sec or lower, and the average temperature rising rate from 460° C. to the 550° C. is 2° C./sec or higher and 40° C./sec or lower.

By performing heating at such a temperature rising rate, the ζ phase is easily formed on the surface layer of the coating layer.

Here, in a case where the temperature in the heating process is 460° C. or lower, the average temperature rising rate from 420° C. to the temperature in the heating process may be 20° C./sec or higher and 100° C./sec or lower.

In a case where the ζ phase is formed on the surface layer of the coating layer in order to enhance strength in adhesion to other members, the temperature in the heating process is preferably 420° C. or higher and 500° C. or lower. When the temperature in the heating process is higher than 500° C., the ζ phase becomes unstable and is divided into a $\delta_1$ phase and a Zn phase.

Furthermore, it is preferable to provide a heavy duty grinding process of performing heavy duty grinding before the first temperature rising process. By performing heavy duty grinding, the grain size of the base iron fine grains in the mixed layer can be further refined.

As for the heavy duty grinding conditions, the grinding amount is preferably in a range of 0.01 g/m² to 3.00 g/m². When the grinding amount is smaller than 0.01 g/m², an effect of refining the base iron grains by the heavy duty grinding is not exhibited. When the grinding amount is greater than 3.00 g/m², there is a possibility that the external appearance may be adversely affected. Even when the heavy duty grinding is performed, the roughness of the base iron formed during the heavy duty grinding is smoothened through subsequent processes from annealing to hot dip zinc plating. That is, when the mixed layer is formed as described in this specification, Fe of the steel sheet diffuses into the zinc coating and moves toward the interface between iron and the coating as shown in FIG. 1. Therefore, even when heavy duty grinding is performed, the convex-concave portions (roughness) of the surface of the steel sheet are not maintained while being in the state after the heavy duty grinding.

In addition, the surface of the steel sheet undergoes strong shearing and is plastically deformed by heavy duty grinding, and thus a large amount of dislocations are introduced and the diffusion speed of atoms is increased. As a result, it is thought that internal oxidation further proceeds in ferrite.

In addition, performing coating of an upper layer on the coated steel sheet of the present invention for the purpose of improving coating properties and weldability, or performing various chemical conversion processes such as a phosphate treatment, a weldability enhancing treatment, and a lubricity enhancing treatment does not depart from the present invention.

EXAMPLES

Next, Examples of the present invention will be described. The conditions of Examples are only a conditional example employed to check the applicability and effects of the present invention, and the present invention is not limited to the conditional example. The present invention can employ various conditions without departing from the spirit of the present invention as long as the object of the present invention is accomplished.

Example

Cold-rolled steel sheets having a thickness of 0.4 mm to 3.2 mm and compositions shown in Table 1 were used as starting sheets, and galvannealed steel sheets were manufactured by using a vertical type hot dip coating simulator. Reduction annealing conditions before coating are shown in Table 2. The maximum arrival temperature was 800° C., and the holding time at the maximum arrival temperature was 100 seconds.

The steel sheet was cooled to 450° C. in nitrogen gas subsequently to annealing and was immersed in a molten zinc bath containing 0.13% of Al for 3 seconds. The temperature of the molten zinc bath was 450° C. which was the same as the temperature at which the steel sheet enters the bath.

After coating, the zinc coating amount was adjusted to 5 µm to 15 µm by a gas wiper, and a heating process was performed. The temperature in the heating process was a temperature shown in Table 2, and the Fe amount in the coating layer was set as shown in Table 2. After the heating, the steel sheet was cooled to room temperature in the nitrogen gas. The composition of the coating layer was measured by melting the coating layer with an acid and performing chemical analysis using ICA.

In addition, observation of the structure of the interface between the coating layer and the steel sheet was performed by processing the steel sheet that was cut into 10 mm×10 mm using a cross-section polisher and thereafter observing 20 or more visual fields of each sample at a magnification of 5,000-fold to 50,000-fold using an FE-SEM. The obtained image data was subjected to image analysis, and for the structure of the interface between the coating and the steel sheet on the steel sheet side, grain sizes in a direction parallel to the initial interface of the steel sheet were measured. A structure having a grain size of 2 μm or smaller was specified as a fine structure.

Figure 3:
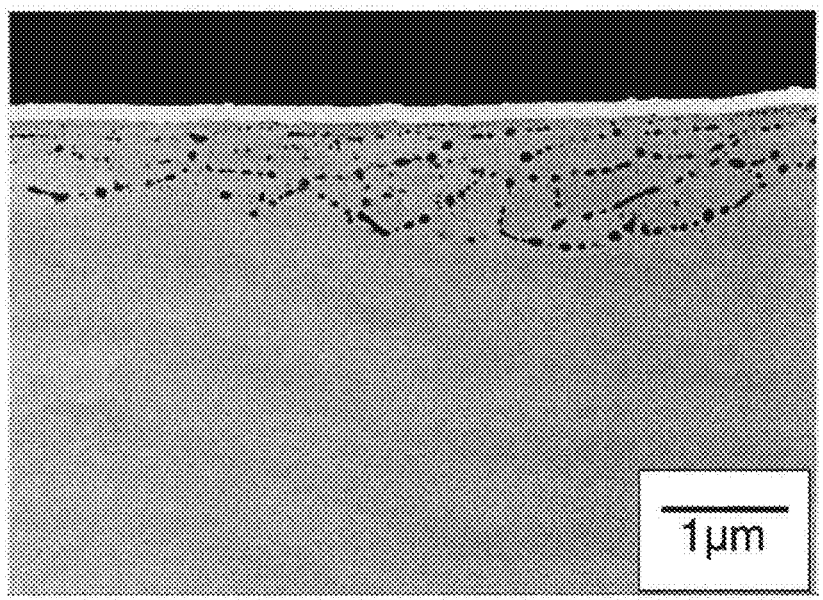
FIG. 3 is a view showing the fine structure after annealing.
Figure 4:
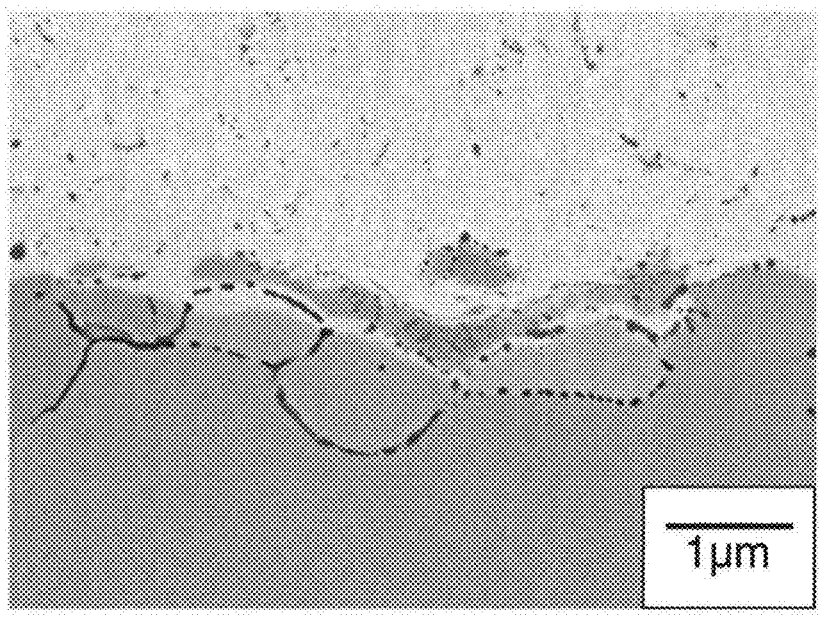
FIG. 4 is a view showing the fine structure after a galvannealing.

FIG. 3 shows a fine structure in which oxides are present in grain boundaries after annealing, and FIG. 4 shows a fine structure in a mixed layer after the galvannealing. It can be seen from FIG. 3 that the fine structure in which oxides are present in grain boundaries is formed in the vicinity of the surface of the steel sheet. In addition, it can be seen from FIG. 4 that a mixed layer having the fine structure in which oxides are present in grain boundaries is formed between the steel sheet and the alloy coating layer.

When a fine structure having grains with a grain size of 2 μm or smaller could not be seen, the average grain size of the fine structure was not measured. In the tables, regarding the average grain size of the fine structure, "—" represents that the fine structure was not observed. In addition, from the image data, presence or absence of the infiltration of the Zn—Fe alloy layer into the grain boundaries of the fine structure as shown in FIG. 1C was checked.

For the steel sheets, powdering resistance, tensile strength, and adhesion strength were examined. The results are shown in Table 2 together with the reduction annealing conditions, the observation results of the interface structures, and the like.

In all of examples (Test Nos. 1 to 19, 21, 22, 27 to 32, 35 to 42, and 48) which satisfied the conditions of the present invention, powdering resistance was excellent.

In a case where a ζ phase was formed on the coating surface layer, higher adhesion strength could be obtained.

TABLE 1

(mass %)

| Steel type | C | Si | Mn | Al | Cr | P | S | Mo | B | O | N | Ti | Nb | Cu | Ni | =Si + Mn + Al + Cr | Note |
|---|---|---|---|---|---|---|---|---|---|---|---|---|---|---|---|---|---|
| S1 | 0.086 | 0.13 | 1.05 | 0.028 | — | 0.011 | 0.0021 | — | — | 0.0018 | 0.0018 | — | — | — | — | 1.208 | Invention Example |
| S2 | 0.090 | 0.49 | 1.79 | 0.031 | — | 0.009 | 0.0018 | — | — | 0.0022 | 0.0019 | — | — | — | — | 2.311 | Invention Example |
| S3 | 0.098 | 0.98 | 2.03 | 0.025 | — | 0.080 | 0.0020 | — | — | 0.0024 | 0.0017 | — | — | — | — | 3.035 | Invention Example |
| S4 | 0.230 | 1.22 | 2.23 | 0.029 | — | 0.010 | 0.0015 | — | — | 0.0021 | 0.0017 | — | — | — | — | 3.479 | Invention Example |
| S5 | 0.250 | 1.81 | 2.86 | 0.029 | — | 0.008 | 0.0026 | — | — | 0.0016 | 0.0017 | — | — | — | — | 4.699 | Invention Example |
| S6 | 0.150 | 2.45 | 0.26 | 0.028 | — | 0.017 | 0.0013 | — | — | 0.0019 | 0.0022 | — | — | — | — | 2.738 | Invention Example |
| S7 | 0.120 | 2.91 | 2.55 | 0.019 | — | 0.007 | 0.0015 | — | — | 0.0019 | 0.0021 | — | — | — | — | 5.479 | Invention Example |
| S8 | 0.450 | 0.12 | 2.03 | 0.034 | — | 0.045 | 0.0028 | — | — | 0.0026 | 0.0017 | — | — | — | — | 2.184 | Invention Example |
| S9 | 0.110 | 0.12 | 0.05 | 0.530 | — | 0.011 | 0.0011 | — | — | 0.0016 | 0.0019 | — | — | — | — | 0.700 | Invention Example |
| S10 | 0.220 | 0.45 | 2.20 | 1.020 | — | 0.013 | 0.0022 | — | — | 0.0015 | 0.0025 | — | — | — | — | 3.670 | Invention Example |
| S11 | 0.250 | 1.19 | 2.45 | 1.080 | — | 0.008 | 0.0016 | — | — | 0.0017 | 0.0029 | — | — | — | — | 4.720 | Invention Example |
| S12 | 0.080 | 0.11 | 0.25 | 0.037 | 0.61 | 0.026 | 0.0018 | — | — | 0.0021 | 0.0019 | — | — | — | — | 1.007 | Invention Example |
| S13 | 0.250 | 0.65 | 2.50 | 0.032 | 1.25 | 0.011 | 0.0026 | — | — | 0.0034 | 0.0017 | — | — | — | — | 4.432 | Invention Example |
| S14 | 0.230 | 1.06 | 2.38 | 0.033 | 1.02 | 0.010 | 0.0015 | — | — | 0.0022 | 0.0022 | — | — | — | — | 4.493 | Invention Example |
| S15 | 0.170 | 0.15 | 0.35 | 0.450 | 0.61 | 0.013 | 0.0120 | — | — | 0.0020 | 0.0019 | — | — | — | — | 1.560 | Invention Example |
| S16 | 0.210 | 0.52 | 2.03 | 0.350 | 0.51 | 0.010 | 0.0011 | — | — | 0.0017 | 0.0020 | — | — | — | — | 3.410 | Invention Example |
| S17 | 0.170 | 1.22 | 1.75 | 0.031 | — | 0.011 | 0.0120 | — | 0.0025 | 0.0017 | 0.0022 | — | — | — | — | 3.001 | Invention Example |
| S18 | 0.220 | 1.18 | 2.25 | 0.033 | — | 0.012 | 0.0021 | 0.15 | — | 0.0019 | 0.0025 | — | — | — | — | 3.463 | Invention Example |
| S19 | 0.220 | 0.15 | 0.20 | 0.100 | — | 0.011 | 0.0023 | — | — | 0.0021 | 0.0018 | — | — | — | — | 0.450 | Invention Example |
| S20 | 0.180 | 1.25 | 2.24 | 0.025 | — | 0.009 | 0.0014 | — | — | 0.0018 | 0.0015 | 0.03 | 0.04 | — | — | 3.515 | Invention Example |
| S21 | 0.195 | 1.10 | 2.01 | 0.032 | — | 0.011 | 0.0018 | — | — | 0.0024 | 0.0019 | — | — | 0.30 | 1.00 | 3.142 | Invention Example |
| S22 | 0.152 | 3.51 | 2.24 | 0.430 | — | 0.012 | 0.0022 | — | — | 0.0023 | 0.0014 | — | — | — | — | 6.180 | Comparative Example |
| S23 | 0.001 | 0.01 | 0.18 | 0.019 | | 0.008 | 0.0017 | | | 0.0016 | 0.0017 | | | | | 0.190 | Comparative Example |

TABLE 2

| Test No. | Steel type | Heavy duty grinding condition Grinding amount (g/m²) | Temperature rising rate between 650° C. and 740° C. (° C./sec) | Annealing temperature (° C.) | Retention time (s) | Hydrogen concentration (%) | Dew point (° C.) | Cooling conditions Cooling rate between 740° C. and 650° C. (° C./sec) | Coating amount (μm) | Fe concentration in coating layer (%) | Al concentration in coating layer (%) | Molten zinc bath temperature (° C.) |
|---|---|---|---|---|---|---|---|---|---|---|---|---|
| 1 | S1 | 0.01 | 2.0 | 800 | 120 | 5 | 0 | 20 | 10 | 10.5 | 0.11 | 455 |
| 2 | S2 | 1.5 | 2.0 | 800 | 120 | 5 | 0 | 10 | 10 | 10.6 | 0.13 | 480 |
| 3 | S3 | 1.5 | 2.0 | 800 | 120 | 5 | 0 | 10 | 10 | 8.8 | 0.10 | 480 |
| 4 | S4 | 1.5 | 2.0 | 800 | 120 | 5 | 0 | 20 | 10 | 10.4 | 0.12 | 470 |
| 5 | S5 | 1.5 | 2.0 | 750 | 120 | 5 | 0 | 20 | 10 | 10.7 | 0.12 | 490 |
| 6 | S6 | 1.5 | 2.0 | 800 | 120 | 5 | 0 | 20 | 10 | 9.8 | 0.15 | 460 |
| 7 | S7 | 1.5 | 2.0 | 800 | 120 | 5 | 0 | 40 | 10 | 9.8 | 0.12 | 450 |
| 8 | S8 | 1.5 | 2.0 | 800 | 120 | 5 | 0 | 10 | 10 | 10.2 | 0.13 | 450 |
| 9 | S9 | 1.4 | 2.0 | 850 | 120 | 5 | 0 | 1 | 10 | 9.8 | 0.14 | 460 |
| 10 | S10 | 1.5 | 2.0 | 800 | 120 | 5 | 0 | 10 | 10 | 10.3 | 0.16 | 460 |
| 11 | S11 | 1.5 | 2.0 | 800 | 30 | 5 | 0 | 20 | 10 | 10.3 | 0.05 | 460 |
| 12 | S12 | 1.5 | 2.0 | 800 | 120 | 5 | 0 | 0.5 | 10 | 10.5 | 0.11 | 480 |
| 13 | S13 | 1.5 | 2.0 | 800 | 120 | 5 | 0 | 5 | 10 | 10.9 | 0.13 | 430 |
| 14 | S14 | 1.5 | 2.0 | 800 | 90 | 5 | 0 | 1 | 10 | 9.8 | 0.14 | 400 |
| 15 | S15 | 1.3 | 2.0 | 800 | 120 | 5 | 0 | 0.5 | 10 | 9.8 | 0.11 | 460 |
| 16 | S16 | 1.5 | 2.0 | 800 | 120 | 5 | 0 | 2 | 10 | 10 | 0.13 | 460 |
| 17 | S17 | 1.5 | 2.0 | 850 | 120 | 5 | 0 | 5 | 10 | 9.8 | 0.12 | 460 |
| 18 | S18 | 1.5 | 2.0 | 750 | 300 | 5 | 0 | 5 | 10 | 10.1 | 0.09 | 500 |
| 19 | S19 | 1.5 | 2.0 | 800 | 120 | 5 | 0 | 20 | 10 | 10.5 | 0.10 | 460 |
| 20 | S4 | 1.5 | 10.0 | 800 | 120 | 5 | 0 | 5 | 10 | 9.5 | 0.12 | 480 |
| 21 | S4 | 1.5 | 0.5 | 800 | 120 | 5 | 0 | 10 | 10 | 9.5 | 0.12 | 480 |
| 22 | S4 | 1.5 | 4.0 | 850 | 120 | 5 | 0 | 5 | 5 | 10.8 | 0.12 | 460 |
| 23 | S4 | 1.5 | 10.0 | 800 | 120 | 5 | 0 | 5 | 5 | 10.3 | 0.11 | 470 |
| 24 | S4 | 2.8 | 0.5 | 770 | 120 | 5 | 0 | 20 | 15 | 10.2 | 0.13 | 460 |
| 25 | S4 | 1.5 | 7.0 | 800 | 120 | 5 | 0 | 5 | 15 | 9.4 | 0.12 | 460 |
| 26 | S4 | 1.5 | 0.5 | 800 | 120 | 5 | −10 | 0.5 | 10 | 9.1 | 0.10 | 450 |
| 27 | S4 | 1.5 | 0.7 | 800 | 120 | 5 | −25 | 5 | 10 | 10.3 | 0.12 | 480 |
| 28 | S4 | 3.0 | 0.5 | 850 | 120 | 15 | 20 | 2 | 10 | 9.9 | 0.09 | 480 |
| 29 | S4 | 1.5 | 1.0 | 800 | 80 | 0.5 | −20 | 5 | 10 | 10.5 | 0.13 | 460 |
| 30 | S4 | 1.5 | 4.0 | 800 | 120 | 0.5 | 5 | 20 | 10 | 10.9 | 0.12 | 450 |
| 31 | S4 | 1.5 | 2.0 | 870 | 120 | 5 | 0 | 10 | 10 | 9.8 | 0.09 | 460 |
| 32 | S4 | 2.0 | 2.0 | 800 | 120 | 5 | 0 | 20 | 10 | 10.6 | 0.12 | 460 |
| 33 | S4 | 1.5 | 10.0 | 800 | 120 | 5 | 0 | 5 | 10 | 10.5 | 0.11 | 460 |
| 34 | S4 | 1.5 | 1.7 | 850 | 120 | 5 | 0 | 10 | 10 | 10.2 | 0.12 | 460 |
| 35 | S4 | 1.5 | 0.5 | 800 | 120 | 5 | 0 | 20 | 10 | 9.9 | 0.09 | 460 |
| 36 | S4 | 1.5 | 2.0 | 800 | 180 | 5 | 15 | 10 | 10 | 10.5 | 0.12 | 450 |
| 37 | S5 | 2.4 | 2.5 | 850 | 120 | 5 | 0 | 40 | 10 | 10.4 | 0.12 | 460 |
| 38 | S5 | 1.5 | 2.0 | 800 | 120 | 5 | 0 | 20 | 10 | 10.6 | 0.13 | 460 |
| 39 | S2 | 1.5 | 2.0 | 800 | 120 | 5 | 0 | 10 | 10 | 10.1 | 0.09 | 465 |
| 40 | S2 | 1.5 | 2.0 | 800 | 120 | 5 | 0 | 10 | 10 | 10.5 | 0.12 | 460 |
| 41 | S20 | 1.5 | 2.0 | 800 | 120 | 5 | 0 | 10 | 10 | 10.8 | 0.25 | 460 |
| 42 | S21 | 1.3 | 2.0 | 800 | 120 | 5 | 0 | 10 | 10 | 11.2 | 0.19 | 460 |
| 43 | S17 | 1.5 | 2.0 | 850 | 120 | 5 | 0 | 10 | 10 | 12.4 | 0.27 | 460 |
| 44 | S22 | 1.7 | 2.0 | 800 | 120 | 5 | 0 | 10 | 10 | 9.4 | 0.29 | 460 |
| 45 | S11 | 1.5 | 2.0 | 800 | 120 | 0.05 | 0 | 10 | 10 | 11.4 | 0.29 | 460 |
| 46 | S5 | 1.5 | 2.0 | 800 | 120 | 5 | 0 | 10 | 10 | 18.2 | 0.005 | 460 |
| 47 | S17 | 1.5 | 2.0 | 800 | 120 | 5 | 0 | 10 | 10 | 19.1 | 0.21 | 460 |
| 48 | S4 | 0 | 0.5 | 800 | 120 | 5 | 0 | 10 | 10 | 9.5 | 0.12 | 460 |
| 49 | S23 | 0 | 2.0 | 800 | 120 | 5 | 0 | 10 | 10 | 14.5 | 0.22 | 460 |

| Test No. | Coating Temperature rising rate between 420° C. and 460° C. (° C.) | Coating Temperature rising rate from 460° C. to alloying treatment temperature (C.) | Alloying treatment Alloying treatment temperature (° C.) | Average grain size of fine structure (μm) | Presence or absence of infiltration of Zn—Fe alloy phase into fine structure grain boundary | Presence or absence of ζ phase in which oxides are not present (surface layer side) | Powdering resistance | Properties Tensile strength (MPa) | Adhesion strength | Note |
|---|---|---|---|---|---|---|---|---|---|---|
| 1 | 60 | 10 | 510 | 1.10 | Present | Absent | G | 450 | G | Invention Example |
| 2 | 100 | 10 | 510 | 0.85 | Present | Absent | VG | 830 | G | Invention Example |
| 3 | 50 | 10 | 510 | 0.85 | Present | Absent | VG | 810 | G | Invention Example |
| 4 | 50 | 2 | 510 | 0.81 | Present | Absent | VG | 790 | G | Invention Example |
| 5 | 20 | — | 450 | 0.25 | Present | Present | VG | 1100 | VG | Invention Example |

TABLE 2-continued

| | | | | | | | | | | | |
|---|---|---|---|---|---|---|---|---|---|---|---|
| 6 | 50 | 10 | 510 | 0.85 | Present | Absent | VG | 1120 | G | Invention Example |
| 7 | 50 | 40 | 510 | 0.71 | Present | Absent | VG | 1210 | G | Invention Example |
| 8 | 50 | 10 | 510 | 1.01 | Present | Absent | G | 790 | G | Invention Example |
| 9 | 50 | 10 | 510 | 1.41 | Present | Absent | G | 390 | G | Invention Example |
| 10 | 100 | 10 | 510 | 0.83 | Present | Absent | VG | 840 | G | Invention Example |
| 11 | 50 | 20 | 550 | 0.74 | Present | Absent | VG | 810 | G | Invention Example |
| 12 | 50 | 10 | 510 | 1.22 | Present | Absent | G | 400 | G | Invention Example |
| 13 | 50 | 10 | 510 | 0.78 | Present | Absent | VG | 410 | G | Invention Example |
| 14 | 50 | 10 | 510 | 0.78 | Present | Absent | VG | 990 | G | Invention Example |
| 15 | 50 | 5 | 510 | 1.18 | Present | Absent | G | 390 | G | Invention Example |
| 16 | 50 | 10 | 510 | 0.82 | Present | Absent | VG | 630 | G | Invention Example |
| 17 | 35 | 10 | 510 | 0.85 | Present | Absent | VG | 1020 | G | Invention Example |
| 18 | 50 | 10 | 510 | 0.90 | Present | Absent | VG | 1050 | G | Invention Example |
| 19 | 50 | 15 | 510 | 1.62 | Present | Absent | G | 350 | G | Invention Example |
| 20 | 50 | 10 | 510 | — | Absent | Absent | NG | 610 | G | Comparative Example |
| 21 | 50 | 10 | 510 | 0.29 | Present | Absent | VG | 790 | G | Invention Example |
| 22 | 60 | — | 480 | 1.02 | Present | Present | G | 640 | VG | Invention Example |
| 23 | 50 | 20 | 510 | — | Absent | Absent | NG | 630 | G | Comparative Example |
| 24 | 50 | 10 | 510 | 0.80 | Present | Absent | VG | 820 | G | Invention Example |
| 25 | 50 | 10 | 510 | — | Absent | Absent | NG | 610 | G | Comparative Example |
| 26 | 50 | 10 | 510 | — | Absent | Absent | NG | 640 | G | Comparative Example |
| 27 | 75 | 10 | 510 | 1.06 | Present | Absent | G | 670 | G | Invention Example |
| 28 | 50 | 25 | 470 | 1.19 | Present | Present | G | 590 | VG | Invention Example |
| 29 | 50 | 10 | 510 | 1.03 | Present | Absent | G | 620 | G | Invention Example |
| 30 | 50 | 10 | 510 | 1.01 | Present | Absent | G | 790 | G | Invention Example |
| 31 | 50 | 10 | 530 | 1.11 | Present | Absent | G | 820 | G | Invention Example |
| 32 | 60 | 30 | 510 | 1.79 | Present | Absent | G | 830 | G | Invention Example |
| 33 | 50 | 10 | 510 | — | Absent | Absent | NG | 820 | G | Comparative Example |
| 34 | 50 | 10 | 510 | — | Absent | Absent | NG | 795 | G | Comparative Example |
| 35 | 70 | 40 | 510 | 0.88 | Present | Absent | VG | 810 | G | Invention Example |
| 36 | 50 | 10 | 510 | 0.79 | Present | Absent | VG | 690 | G | Invention Example |
| 37 | 50 | 10 | 480 | 0.65 | Present | Present | VG | 1240 | VG | Invention Example |
| 38 | 50 | 10 | 510 | 1.46 | Present | Absent | G | 1050 | G | Invention Example |
| 39 | 40 | 35 | 510 | 1.02 | Present | Absent | G | 860 | G | Invention Example |
| 40 | 50 | 10 | 510 | 1.28 | Present | Absent | G | 840 | G | Invention Example |
| 41 | 50 | 10 | 510 | 1.50 | Present | Absent | G | 840 | G | Invention Example |
| 42 | 50 | 3 | 510 | 1.20 | Present | Absent | G | 880 | G | Invention Example |
| 43 | 30 | 10 | 510 | — | Absent | Absent | NG | 1020 | G | Comparative Example |
| 44 | 50 | 10 | 510 | 1.10 | Present | Absent | NG | 1230 | G | Comparative Example |
| 45 | 50 | 5 | 510 | 0.89 | Present | Absent | NG | 810 | NG | Comparative Example |

TABLE 2-continued

| | | | | | | | | | | |
|---|---|---|---|---|---|---|---|---|---|---|
| 46 | 50 | 10 | 510 | 0.85 | Present | Absent | NG | 1100 | G | Comparative Example |
| 47 | 30 | 10 | 600 | 1.08 | Present | Absent | NG | 1020 | G | Comparative Example |
| 48 | 50 | 10 | 510 | 1.98 | Present | Absent | G | 790 | G | Invention Example |
| 49 | 50 | 10 | 510 | — | Absent | Absent | NG | 290 | G | Comparative Example |

An evaluation method of powdering resistance was as follows.

Powdering Resistance

The galvannealed steel sheet manufactured in the above-described method was cut into a size of 40-mm width×250-mm length, and was processed into a molded height of 65 mm using a die of half-round beads having a size of r=5 mm with a punch shoulder radius of 5 mm and a die shoulder radius of 5 mm. During the processing, coating layers that were peeled off were measured and evaluated according to the following criteria.

In Test No. 45, non-coating defects were generated.

Evaluation Criteria

Amount of peeled coating:
    smaller than 3 $g/m^2$: VG (VERY GOOD)
    3 $g/m^2$ or greater and smaller than 6 $g/m^2$: G (GOOD)
    6 $g/m^2$ or greater and smaller than 10 $g/m^2$: NG (NO GOOD)

In addition, a tensile test was performed in a method according to JIS Z 2241 to obtain tensile strength.

In addition, an evaluation method of adhesion strength was performed as follows using a tensile shear test.

The galvannealed steel sheet manufactured in the above-described method was cut into a size of 25-mm width×100-mm length, two sheets having the size were prepared, and an adhesive agent was applied to overlapping portions of the sheets to be bonded to each other in a state where the sheets were shifted from each other by 12.5 mm in the through-length direction.

A commercially available epoxy-based adhesive was used as the adhesive agent, and was applied to the adhesion surface of 25 mm×12.5 mm so that a thickness is about 100 μm. The prepared test pieces were cooled and left for 5 hours, and were pulled at a rate of 50 m/min in an atmosphere of 0° C. for the tensile shear test. The maximum load until breakage was measured, and the adhesion strength was measured by using a tensile shear strength obtained by dividing the maximum load by a shear area (adhesion area).

Evaluation Criteria

Tensile shear strength:
    180 $Kgf/mm^2$ or higher: VG
    140 $Kgf/mm^2$ or higher and lower than 180 $Kgf/mm^2$: G
    lower than 140 $Kgf/mm^2$: NG

INDUSTRIAL APPLICABILITY

As described above, according to the present invention, a galvannealed steel sheet having dramatically enhanced coating adhesion can be provided. Therefore, the present invention is high applicable to the galvanized steel sheet manufacturing industry.

BRIEF DESCRIPTION OF THE REFERENCE SYMBOLS

1: FINE STRUCTURE (FINE GRAINS)
2: COATING LAYER
3: ALLOY COATING LAYER
4: OXIDE
5: Zn—Fe ALLOY PHASE
6: OXIDE FILM
11: BASE IRON PORTION
13: MIXED LAYER
21: ζ PHASE

The invention claimed is:

1. A galvannealed steel sheet comprising:
a steel sheet;
a coating layer on a surface of the steel sheet; and
a mixed layer formed between the steel sheet and the coating layer,
wherein the steel sheet contains, in terms of mass %,
    C: 0.050% or more and 0.50% or less, and
    Mn: 0.01% or more and 3.00% or less,
further contains, in terms of mass%, one type or two or more types of
    Si: 0.01% or more and 3.00% or less,
    Al: 0.010% or more and 2.00% or less, and
    Cr: 0.01% or more and 2.00% or less,
limits amounts of P, S, O, N, Ti, Nb, Mo, Cu, Ni, and B, in terms of mass %, to
    P: 0.100% or less,
    S: 0.0200% or less,
    O: 0.0100% or less,
    N: 0.0100% or less,
    Ti: 0.150% or less,
    Nb: 0.150% or less,
    Mo: 1.00% or less,
    Cu: 2.00% or less,
    Ni: 2.00% or less, and
    B: 0.0100% or less,
satisfies [Mn]+[Si]+[Al]+[Cr]≥0.4, wherein the Mn content, the Si content, the Al content, and the Cr content are respectively expressed by [Mn], [Si], [Al], and [Cr] in terms of mass %, and
contains a remainder including Fe and unavoidable impurities,
the coating layer is a galvannealed layer containing, in terms of mass %,
    Fe: 7.0% or more and 15.0% or less,
    Al: 0.01% or more and 1.00% or less, and
    a remainder including Zn and unavoidable impurities,
the mixed layer includes
    a base iron portion having fine grains having a size of greater than 0 μm and equal to or smaller than 2 μm,
    a Zn—Fe alloy phase, and
    oxides containing one or more types of Mn, Si, Al, and Cr, and
in the mixed layer, the oxides and the Zn—Fe alloy phase are present in grain boundaries that form the fine grains, and the Zn—Fe alloy phase is tangled with the base iron portion.

2. The galvannealed steel sheet according to claim 1,
wherein an average thickness of the mixed layer in a direction along a through-thickness direction of the steel sheet is 10 μm or smaller.

3. The galvannealed steel sheet according to claim 1,
wherein the Zn—Fe alloy phase in the mixed layer has a shape that protrudes in a V-shape toward a thickness center of the steel sheet from the coating layer when viewed in a cross-section in the through-thickness direction of the steel sheet.

4. The galvannealed steel sheet according to claim 1,
wherein, when 10 or more visual fields of the mixed layer are observed along an interface between the mixed layer and the coating layer by using a scanning electron microscope at a magnification of 5,000-fold so that a length of each visual field in a direction along the interface is 25 μm, the fine grains having the grain boundaries in which the Zn—Fe alloy phase is present in the mixed layer are observed in 20% or greater of the entirety of the observed visual fields.

5. The galvannealed steel sheet according to claim 1,
wherein the Zn—Fe alloy phase in the mixed layer is generated by a reaction between Zn infiltrating from the coating layer during a galvannealing and Fe in the steel sheet.

6. The galvannealed steel sheet according to claim 1,
wherein a surface layer region on the coating layer, which is a region of 1μm or smaller from the surface of the coating layer, is a Zn—Fe alloy phase which contains a ζ phase that does not contain said oxides containing one or more types of Mn, Si, Al and Cr.

7. The galvannealed steel sheet according to claim 6,
wherein an average thickness of the mixed layer in a direction along a through-thickness direction of the steel sheet is 10 μm or smaller.

8. The galvannealed steel sheet according to claim 6,
wherein the Zn—Fe alloy phase in the mixed layer has a shape that protrudes in a V-shape toward a thickness center of the steel sheet from the coating layer when viewed in a cross-section in the through-thickness direction of the steel sheet.

9. The galvannealed steel sheet according to claim 6,
wherein, when 10 or more visual fields of the mixed layer are observed along an interface between the mixed layer and the coating layer by using a scanning electron microscope at a magnification of 5,000-fold so that a length of each visual field in a direction along the interface is 25 μm, the fine grains having the grain boundaries in which the Zn—Fe alloy phase is present in the mixed layer are observed in 20% or greater of the entirety of the observed visual fields.

10. The galvannealed steel sheet according to claim 6,
wherein the Zn—Fe alloy phase in the mixed layer is generated by a reaction between Zn infiltrating from the coating layer during a galvannealing and Fe in the steel sheet.

11. A method for manufacturing the galvannealed steel sheet of claim 1, the method comprising:
a first temperature rising process of heating the steel sheet in an atmosphere which contains 0.1 vol. % or more and 50 vol. % or less of hydrogen and a remainder including nitrogen and unavoidable impurities and has a dew point of higher than −30° C. and equal to or lower than 20° C. at a first temperature rising rate of 0.2° C./sec or higher and 6° C./sec or lower, which is an average temperature rising rate between 650° C. and 740° C.;
a second temperature rising process of heating the steel sheet from 740° C. to an annealing temperature of 750° C. or higher and 900° C. or lower in the atmosphere same as that of the first temperature rising process, after the first temperature rising process;
an annealing process of allowing the steel sheet to be retained in the atmosphere same as that of the second temperature rising process at the annealing temperature for 30 seconds or longer and 300 seconds or shorter, after the second temperature rising process;
a cooling process of cooling the steel sheet after the annealing process; and
a galvannealing process comprising of;
a plating process of performing hot dip zinc plating on the steel sheet after the cooling process and
a heating process of performing a heating on the steel sheet at a temperature of 420° C. to 550° C. after the plating process.

12. The method according to claim 11, further comprising:
a heavy duty grinding process of performing a heavy duty grinding under a condition of a grinding amount of 0.01 g/m$^2$ to 3.00 g/m$^2$ before the first temperature rising process.

13. The method according to claim 11,
wherein an average cooling rate between 740° C. and 650° C. in the cooling process is 0.5° C./sec or higher.

14. The method according to claim 11,
wherein the annealing process is performed in a radiant tube furnace of a continuous hot dip coating facility.

15. The method according to claim 11,
wherein the steel sheet is immersed in a molten zinc bath which contains 0.01% or more and 1.00% or less of Al and has a bath temperature of 430° C. or higher and 500° C. or lower in the plating process.

16. The method according to claim 11,
wherein, in the heating process, an average temperature rising rate between 420° C. and 460° C. is 20° C./sec or higher and 100° C./sec or lower, and
an average temperature rising rate from 460° C. to 550° C. is 2° C./sec or higher and 40° C./sec or lower.

17. The method according to claim 11,
wherein the temperature in the heating process is 420° C. or higher and 500° C. or lower.

18. The method according to claim 17, further comprising:
a heavy duty grinding process of performing a heavy duty grinding under a condition of a grinding amount of 0.01 g/m$^2$ to 3.00 g/m$^2$ before the first temperature rising process.

19. The method according to claim 17,
wherein the steel sheet is immersed in a molten zinc bath which contains 0.01% or more and 1.00% or less of Al and has a bath temperature of 430° C. or higher and 500° C. or lower in the plating process.

20. The method according to claim 17,
wherein, in the heating process, an average temperature rising rate between 420° C. and 460° C. is 20° C./sec or higher and 100° C./sec or lower, and
an average temperature rising rate from 460° C. to 550° C. is 2° C./sec or higher and 40° C./sec or lower.

* * * * *